US009531825B1

(12) United States Patent
Brooks et al.

(10) Patent No.: US 9,531,825 B1
(45) Date of Patent: Dec. 27, 2016

(54) BROWSER ACTIVITY REPLAY WITH ADVANCED NAVIGATION

(71) Applicant: International Business Machines Corporation, Armonk, NY (US)

(72) Inventors: Damie L. Brooks, Albuquerque, NM (US); Lalith K. Maddali, Fremont, CA (US); Manoj Punjabi, Dublin, CA (US); Sukhbir Singh, Hayward, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/066,100

(22) Filed: Mar. 10, 2016

Related U.S. Application Data

(63) Continuation of application No. 14/859,400, filed on Sep. 21, 2015.

(51) Int. Cl.
*G06F 17/00* (2006.01)
*H04L 29/08* (2006.01)
*G06F 11/34* (2006.01)
*G06F 17/30* (2006.01)

(52) U.S. Cl.
CPC .............. *H04L 67/22* (2013.01); *G06F 11/34* (2013.01); *G06F 11/3438* (2013.01); *G06F 17/30861* (2013.01); *G06F 17/30873* (2013.01); *G06F 17/30876* (2013.01); *G06F 17/30884* (2013.01)

(58) Field of Classification Search
CPC ............. H04L 67/22; G06F 17/30876; G06F 17/30884; G06F 17/30873; G06F 17/30861; G06F 11/34; G06F 11/3438
See application file for complete search history.

(56) References Cited

U.S. PATENT DOCUMENTS

| | | | | |
|---|---|---|---|---|
| 6,535,912 B1 * | 3/2003 | Anupam | ........... | G06F 17/30884 707/E17.114 |
| 6,667,751 B1 * | 12/2003 | Wynn | ............... | G06F 17/30876 707/E17.112 |
| 7,634,562 B2 * | 12/2009 | Litofsky | ............. | G06F 17/3089 709/219 |
| 8,433,733 B2 * | 4/2013 | Sayed | ..................... | G06F 9/542 707/658 |

(Continued)

OTHER PUBLICATIONS

Chrome Blog, Tip: Recovering closed tabs:, Feb. 23 2010, Google, 3 pages.*

(Continued)

*Primary Examiner* — William Bashore
*Assistant Examiner* — David Faber
(74) *Attorney, Agent, or Firm* — Cantor Colburn LLP; Isaac Gooshaw

(57) ABSTRACT

Aspects include capturing and replaying activities conducted during a web browsing session. Activities conducted by a user via browser application at a website are received at a computer processor. The activities occur across multiple web pages and span multiple windows during a single browsing session. The activities associated with corresponding web pages, and the activities are ordered in chronological order for each of the web pages. User interface events corresponding to the ordered activities are displayed via a browser based interface. The user interface events are selectable by an end user of the browser based interface.

1 Claim, 5 Drawing Sheets

(56) References Cited

U.S. PATENT DOCUMENTS

| | | | | |
|---|---|---|---|---|
| 8,468,502 B2* | 6/2013 | Lui | G06F 11/3612 | 717/125 |
| 8,577,863 B2* | 11/2013 | Yu | G06Q 30/02 | 707/706 |
| 9,355,078 B2* | 5/2016 | Yi | G06F 17/2247 | |
| 2002/0165954 A1* | 11/2002 | Eshghi | H04L 12/2602 | 709/224 |
| 2002/0191015 A1* | 12/2002 | Brown | G06F 17/30876 | 715/738 |
| 2004/0100507 A1* | 5/2004 | Hayner | H04L 67/22 | 715/855 |
| 2004/0111727 A1* | 6/2004 | Schwarzbauer | G06F 11/36 | 719/310 |
| 2005/0257400 A1* | 11/2005 | Sommerer | G06F 17/30873 | 36/13 |
| 2006/0230058 A1* | 10/2006 | Morris | G06Q 10/063 | |
| 2007/0050844 A1* | 3/2007 | Lebel | G06F 11/3414 | 726/13 |
| 2007/0067333 A1* | 3/2007 | Cho | G06F 17/30873 | |
| 2007/0271230 A1* | 11/2007 | Hart | G06F 17/30876 | |
| 2008/0046218 A1* | 2/2008 | Dontcheva | G06F 11/32 | 702/186 |
| 2008/0046562 A1* | 2/2008 | Butler | G06F 17/3089 | 709/224 |
| 2008/0229231 A1* | 9/2008 | Delia | G06F 17/30905 | 715/781 |
| 2009/0019354 A1* | 1/2009 | Jaiswal | G06F 17/3089 | 715/224 |
| 2009/0240686 A1* | 9/2009 | Murali | G06F 17/30876 | |
| 2010/0005169 A1* | 1/2010 | Von Hilgers | G06Q 10/00 | 709/224 |
| 2011/0173239 A1* | 7/2011 | Sayed | G06F 9/542 | 707/821 |
| 2011/0239138 A1* | 9/2011 | Galushka | G06F 17/3089 | 715/760 |
| 2012/0290938 A1* | 11/2012 | Subbarao | H04L 67/22 | 715/738 |
| 2014/0279793 A1* | 9/2014 | Wohlstadter | G06Q 30/0269 | 706/46 |
| 2014/0280566 A1* | 9/2014 | Chen | H04L 67/306 | 709/204 |
| 2014/0281858 A1* | 9/2014 | Yi | G06F 17/2247 | 715/205 |
| 2014/0366117 A1* | 12/2014 | Kumar | H04L 63/02 | 726/11 |
| 2014/0373030 A1 | 12/2014 | Francis | | |
| 2015/0007065 A1* | 1/2015 | Krishnamoorthy | H04L 67/22 | 715/760 |
| 2015/0193549 A1* | 7/2015 | Frye | G06F 3/0482 | 715/739 |
| 2015/0350253 A1* | 12/2015 | Alderson | H04L 63/20 | 726/1 |

OTHER PUBLICATIONS

Brinkmann, Martin, "How to restore tabs in Google Chrome", Sep. 26, 2013, ghack.net, 6 pages.*

Kaufman, Lori, "Restore Recently Closed Tabs in Chrome, Firefox, Opera, Internet Explorer 9, and Safari", Sep. 24, 2012, How-To Geek, 6 pages.*

* cited by examiner

BROWSER ACTIVITY REPLAY WITH ADVANCED NAVIGATION

DOMESTIC PRIORITY

This application is a continuation of U.S. patent application Ser. No. 14/859,400 filed Sep. 21, 2015, the disclosure of which is incorporated by reference herein in its entirety.

BACKGROUND

The present invention relates to browser activity replay, and more specifically, to multi-window, multi-tab browser activity replay.

SUMMARY

According to one embodiment of the present invention, a method for browser activity replay with advanced navigation is provided. The method includes receiving, by a computer processor, activities conducted by a user via browser application at a website. The activities occur across multiple web pages and span multiple windows during a single browsing session. The method also includes associating the activities with corresponding web pages, ordering the activities in chronological order for each of the web pages, and displaying, via a browser based interface, user interface events corresponding to the ordered activities. The user interface events are selectable by an end user of the browser based interface.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In a replay mode of a recorded web interaction, one might expect to see the complete user interaction on their web site or mobile application. Web 1.0 style applications which contain popup windows or web applications that allow users to open multiple tabs demand a holistic experience of multiple window replay. In some cases, interactions in one window reflect interactions in parent windows or windows from the same website. It is possible that interactions in child windows can change the data in a parent window. In a sequential single window replay, one would miss the flow of user interaction.

Exemplary embodiments are directed to browser activity replay with advanced navigation. The browser activity replay processes enable multi-window, multi-tab browser activity replay of end users of corresponding browser sessions at a website. Views are shown as layered popup windows. By providing the views as layered popups, users can better correlate to the original experience of the website.

Figure 1:
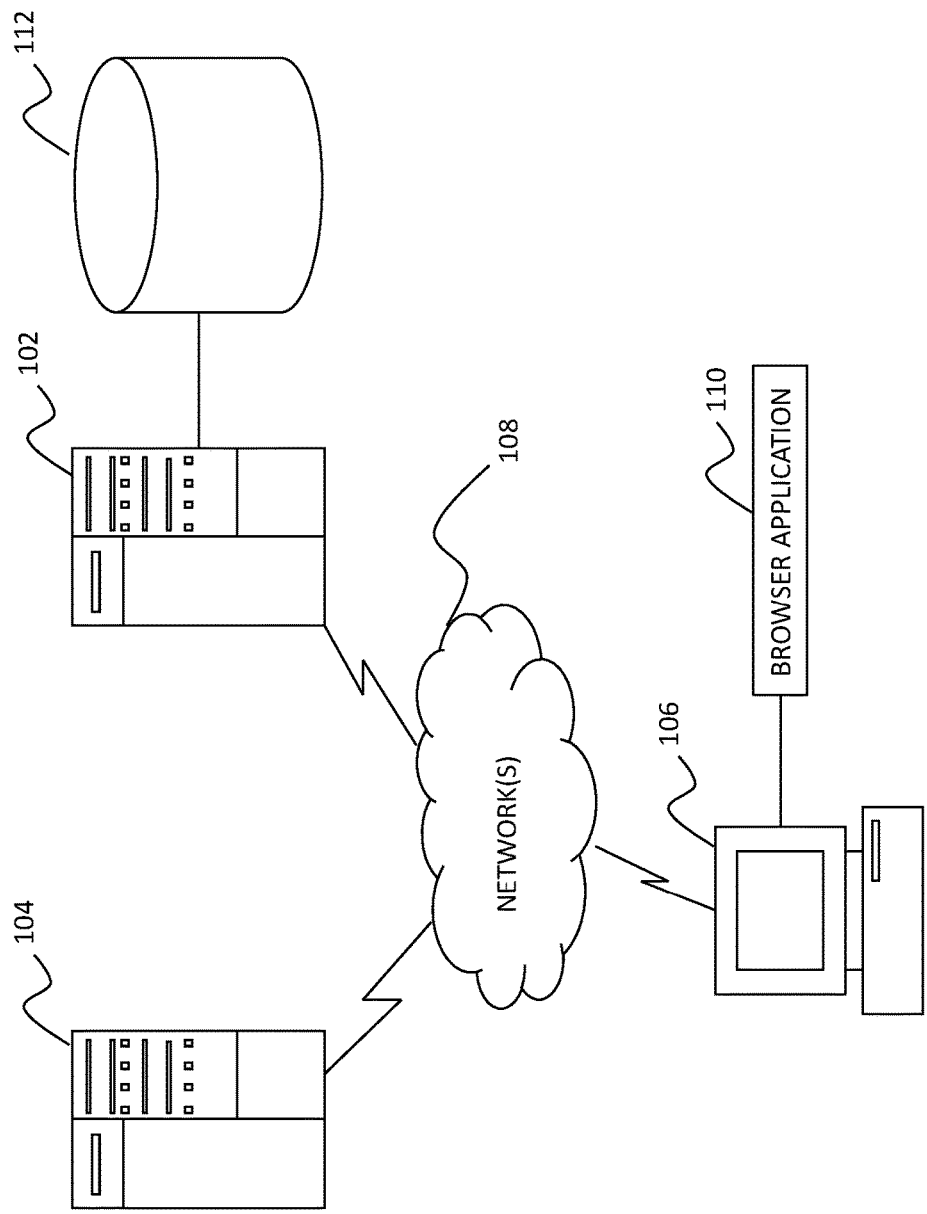
FIG. 1 depicts a block diagram of a system upon which browser activity replay processes may be implemented according to an embodiment of the present invention.

Turning now to FIG. 1, a block diagram of a system for implementing browser activity replay processes will now be described. The system 100 of FIG. 1 includes a host system server 102, a client server 104, and a user system 106, each of which is communicatively coupled to one or more networks 108. The networks 108 may be any type of network or combination of networks known in the art.

The host system server 102 and client server 104 may be implemented, e.g., via any high-speed computer processing device capable of performing a high volume of activities as described herein. In an embodiment, the host system server 102 executes one or more applications for implementing the browser activity replay processes described herein. The host system server 102 may perform these processes as a service to one or more client enterprises, e.g., client server 104. The host system server 102 is communicatively coupled to a storage device 112 for storing user activities conducted at client server websites.

The user system 106 may be a general purpose computer or desktop computer, mobile device, or other type of processing device. The user system 106 executes a browser application 110 for accessing one or more websites (e.g., a website of the client server 104) and performing various activities therefrom.

Figure 2:
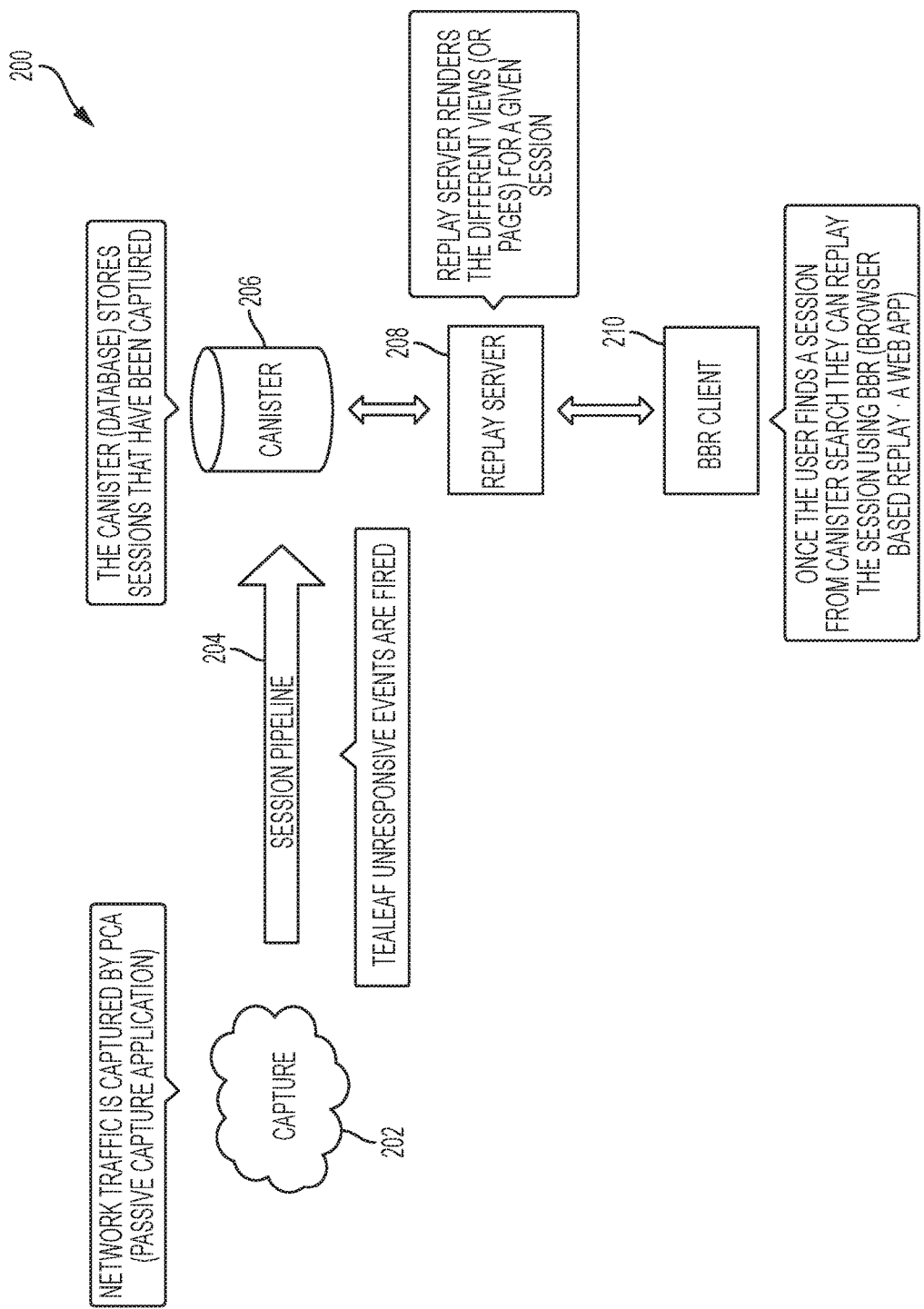
FIG. 2 depicts an architecture that may be used in implementing browser activity replay processes according to an embodiment of the present invention.

Turning now to FIG. 2, a diagram depicting an architecture that may be used in implementing browser activity replay processes will now be described in an embodiment. The architecture 200 includes a network 202 through which user activities conducted by user systems are captured. As shown in FIG. 2, data may be captured through a network 202 via a passive capture application and is distributed to a storage device 206 via a session pipeline 204. The session indicates a browser session conducted between a user system and a client server's website. The captured data is stored in the storage device 206. In an embodiment, the network 202 may correlate the network 108 of FIG. 1. In addition, the storage device 206 may correlate to the storage device 112 of FIG. 1.

A replay server 208 (which may correlate to one or both of the client server 104 and the host system server 102) renders different views or pages for a given browsing session via a browser based replay application 210, as will be described further herein.

Figure 3:
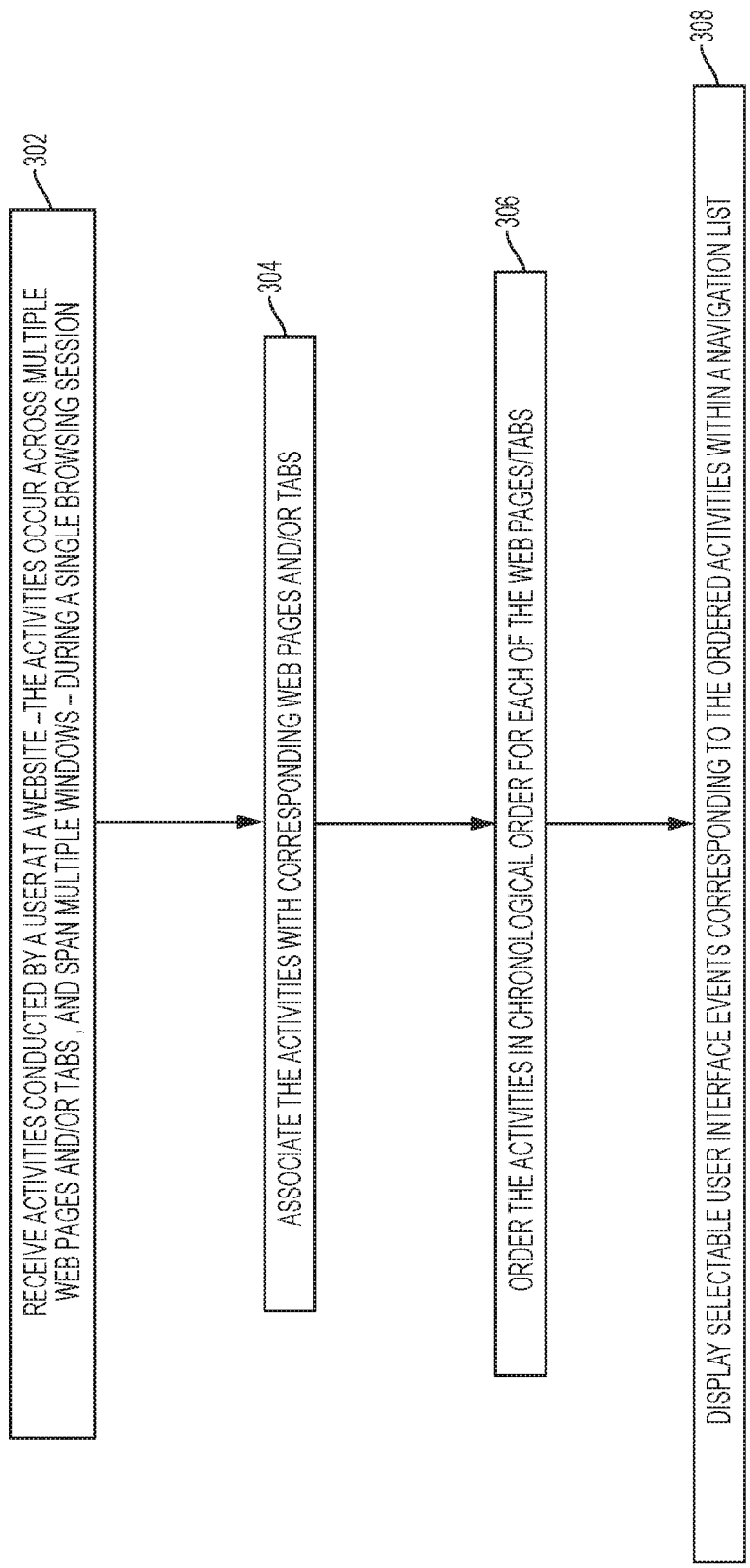
FIG. 3 depicts a flow diagram of a process for implementing browser activity replay with advanced navigation according to an embodiment of the present invention.

Turning now to FIG. 3, a flow diagram describing a process for implementing browser activity replay with advanced navigation will now be described in an embodiment. At block 302, activities conducted by a user (e.g., user system 106) via a web browser application (e.g., browser 110) are received. The user activities may be collected on the client side (user system) via, e.g., Javascript Libraries. Each interaction message contains the client-side timestamp of when the interaction occurred. Client messages may also include Load and Unload of page events, which act as markers of when a window or page was created or removed. The client may send data as a batch containing many messages from the same web page.

The user activities may occur across multiple web pages and span multiple tabs and/or windows during a single browsing session of the user. The activities include scrolling through a web page, selecting a tab, selecting a link on the web page, advancing to a different web page, returning to a previous web page, logging in to a web site, logging out of a web site, entering data into a form, and creating a message, to name a few.

Receiving the activities includes receiving messages including timestamps indicating when each of the activities occurred.

At block 304, the activities are associated with their corresponding web pages. This may be implemented by assigning an identifier to the activities that indicates their association with the corresponding web page. At block 306, the activities are ordered in chronological order (e.g., via their timestamps) for each of the web pages.

At block 308, user interface events corresponding to the ordered activities are displayed via a browser based interface. The displaying of the user events includes displaying the load and unload events in chronological order of occurrence. The load and unload events indicate loading and unloading of the web pages by the end user.

The events are selectable by a user of the browser based interface. Sample interface screens are shown in FIGS. 4 and 5.

Upon receiving a selected user interface event, the browser based interface determines a number of windows that are active at the time the activities were captured. This determination may be implemented by traversing upward in the navigation list and identifying all load messages that do not have matching unload messages.

The display process may be implemented by creating hypertext markup language (HTML) popup windows with iframes pointing to a most recent replay of each active window, and overlaying the popup windows on top of each other with an ordered index of the popup windows, to indicate most recent activities on each active window. Alternatively, the display process may be implemented by displaying active windows as tabs. Upon selection of one of the corresponding entries in the navigation list, a replay of a corresponding window is displayed.

Figure 4:
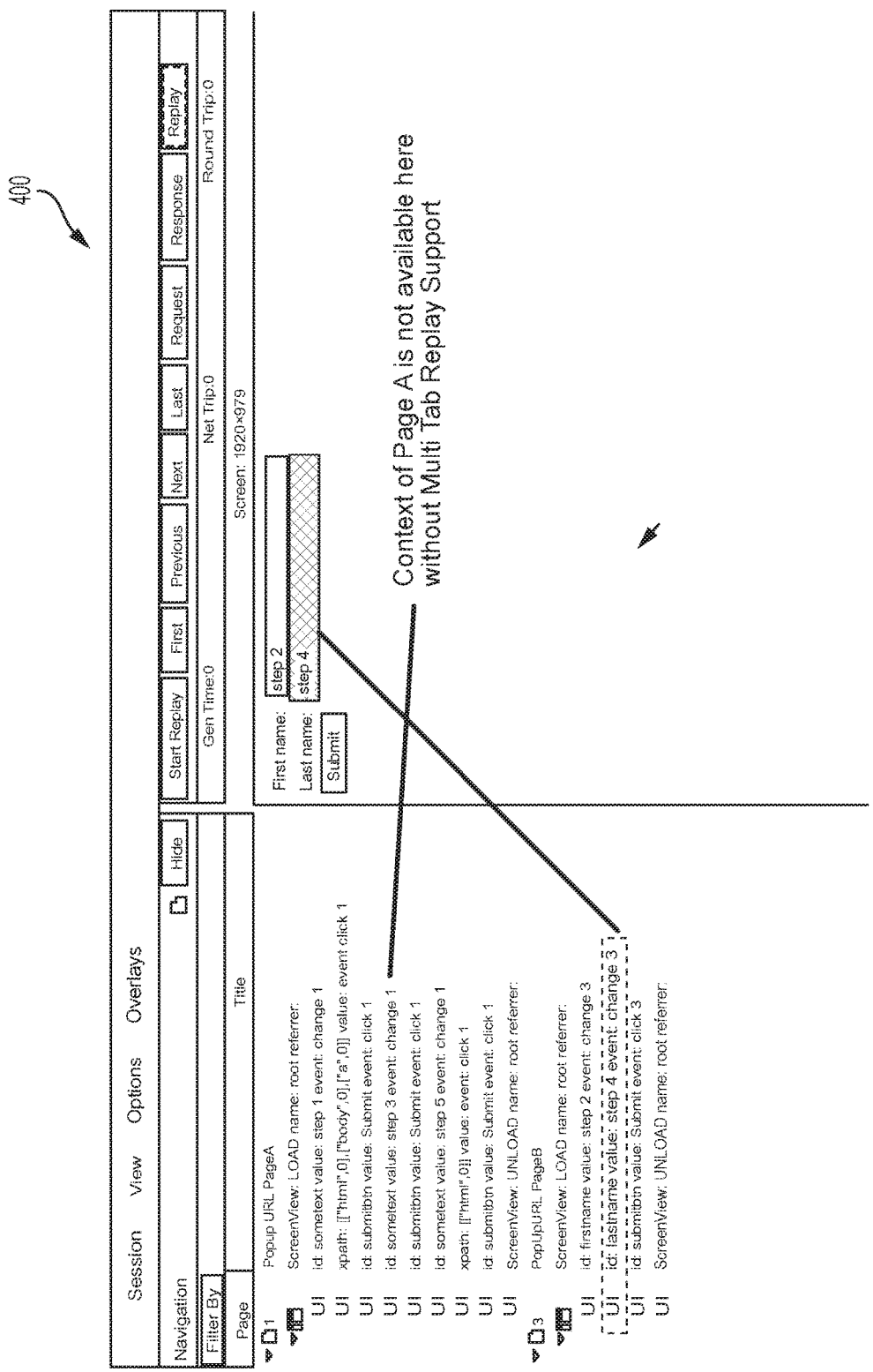
FIG. 4 depicts a user interface including an unordered navigation list in accordance with an embodiment of the present invention.
Figure 5:
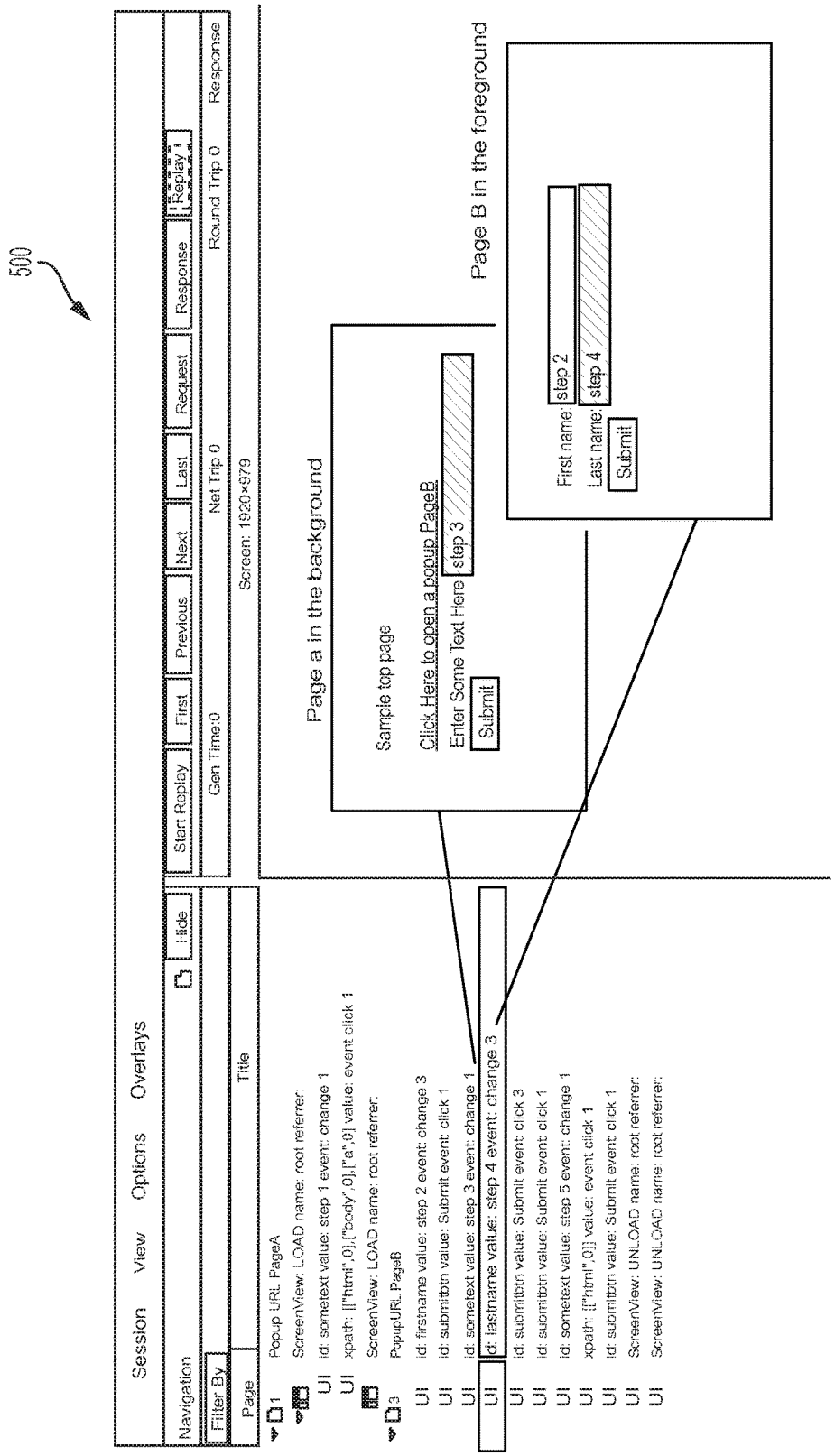
FIG. 5 depicts a user interface including an ordered navigation list in accordance with an embodiment of the present invention.

FIG. 4 illustrates a user interface including an unordered navigation list, and FIG. 5 depicts a user interface including an ordered navigation list.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of capturing and replaying activities conducted during a web browsing session, the method comprising:
   receiving activities conducted by a user via a browser application at a website, the activities occurring across multiple web pages and spanning multiple windows and multiple tabs across the multiple web pages during a single browsing session,
   wherein the activities include scrolling through a web page, selecting a tab, selecting a link on the web page, advancing to a different web page, returning to a previous web page, logging into the web site, logging out of the web site, entering data into a form, and creating a message, and
   wherein the receiving includes receiving messages including timestamps and load and unload events associated with the activities, each timestamp indicating when a corresponding activity occurred and the load and unload events indicating loading and unloading of the web pages;
   associating the activities with corresponding web pages, the associating including associating the activities spanning the multiple tabs with corresponding tabs;
   ordering the activities in chronological order for each of the web pages based on the corresponding timestamps;
   displaying user interface events corresponding to the ordered activities in a navigation list via the browser based interface, wherein the user interface events are selectable by an end user of the browser based interface, and wherein displaying the user interface events comprises displaying the load and unload events in chronological order of occurrence;
   receiving a selection of a user interface event; and
   after receiving the selection of the user interface event:
      determining, by the browser based interface, a number of active windows at the time the activities were captured, the determining implemented by traversing upward in the navigation list and identifying all load messages that do not have matching unload messages;
   creating hypertext markup language (HTML) popup windows with iframes pointing to a most recent replay of each active window; and overlaying the popup windows on top of each other with an ordered index of the popup windows to indicate most recent activities on each active window.

* * * * *